United States Patent Office 3,563,016
Patented Feb. 16, 1971

3,563,016
SENSING UNIT FOR A GRAPE HARVESTER FOR ENABLING THE CUTTING APPARATUS TO FOLLOW THE SURFACE TO BE WORKED
Cheslav Stanislavovich Tolochko, Ulitsa Budennovskaya 203/2, kv. 17; and Vladimir Ivanovich Popov, Ulitsa Budennovskaya 203/2, kv. 9, both of Novocherkassk, U.S.S.R.; and Miron Vasilievich Tsitsiv, Ulitsa Nagornaya 14; Alexandr Nikolaevich Varfolomeev, Kotovskoe shosse 22b, kv. 16; and Marlen Mikhailovich Gervolsky, Ulitsa Frunze 9, kv. 3, all of Kishinev, U.S.S.R.
Filed Nov. 8, 1967, Ser. No. 681,435
Int. Cl. A01g 19/00
U.S. Cl. 56—331
4 Claims

ABSTRACT OF THE DISCLOSURE

A sensing unit is provided for enabling the operating elements of grape harvesters to follow the surfaces to be worked and specifically enabling the cutting apparatus of the grape harvester to follow the surface of the trellis canopy; the unit comprises a grape harvester frame and an actuating mechanism mounted on the frame in turn supporting a movable control element which is operated by a hydraulic drive system by means of two valve-type hydraulic selectors.

---

The present invention relates to sensing units as in U.S. Pat. 2,893,194 enabling the operating elements of grape harvesters to follow the surfaces of grape bushes and more specifically to sensing units enabling the cutting apparatus of the escape harvesters to follow the surface of the trellis canopy.

The known sensing units enabling the operating elements of the machines to follow the surfaces, particularly enabling the grape harvester cutting apparatus to follow the surface of the trellis canopy are designed so that the feeler mechanism of the machine operating element is interconnected with the actuating mechanism by a hydraulic drive system.

These sensing units are provided with one feeler mechanism intended to protect the grape harvester cutting apparatus against damage by deflecting it from the trellis support rods when the feeler mechanism shaft interacts with said support rods.

Disadvantages of the known sensing units consist in that they fail to ensure three-dimensional following, cannot compensate for the cocking caused by irregular sagging of the trellis canopy due to a varying weight of the grape clusters and non-uniformly tensioned trellis framework wires, and for topography in the vineyard row spaces which cause cocking of the entire machine.

An object of this invention resides eliminating the above disadvantages.

The main object of the invention is to provide a sensing unit enabling the operating elements of grape harvesters to follow the surfaces of grape bushes and, more specifically, enabling the grape harvester cutting apparatus to follow the surface of the trellis canopy, said invention ensuring accurate positioning of the blade edges of the cutting apparatus across the grape cluster stems regardless of the non-uniform sagging of the trellis canopy under the weight of grape clusters, non-uniform tensioning of the canopy framework wires, and cocking of the machine due to irregularities of the surface of the ground in the vineyard row spaces.

This object is carried into effect by mounting two feeler mechanisms on the operating element of the machine, said mechanisms being connected to at least single-valve hydraulic selectors secured on the operating element which is installed on the machine with a possibility of three-dimensional travel means of the actuating mechanism which ensures both direct and reverse connection between them.

It is practicable to make each feeler mechanism in the form of a hinged and spring-loaded curved plate.

It is also practicable to mount each feeler mechanism on top of and somewhat behind the operating element of the machine, in particular, on top of the grape harvester carrier bar and somewhat behind the edges of the blades of the cutting apparatus.

It is expedient to make the actuating mechanism in the form of two hydraulic power cylinders and at least one guide connected to the machine frame, said guide accommodating a rod articulated to the cutting apparatus.

For separate operation of the feeler mechanisms it is practicable to provide the operating element with two interlocks made in the shape of hinged and spring-loaded curved plates connected by a system of links and levers to the hydraulic selector valves. It is desirable that the hinged and spring-loaded curved plates be mounted on top of the carrier bar, and somewhat behind, the edges of the blades of the cutting apparatus.

It is practicable to mount the hinged and spring-loaded curved plates of interlocks on the carrier bar of the operating element at least side by side with the curved plates of the feeler mechanisms.

It is desirable that the connection between the feeler mechanism curved plates and the hydraulic selector valve rods be constituted by telescopic sleeves with a spring placed therebetween; one of the sleeves being rigidly connected to the carrier bar of the operating element and the second sleeve being rigidly connected to the curved plate of the feeler mechanism.

It is desirable that one end of the spring should bear against the bottom of the sleeve rigidly connected to the curved plate of the feeler mechanism, its other end bearing against a screw used for adjusting the pressure exerted by the cutter bar to the trellis canopy. The screw can be accommodated in the hole of the sleeve secured on the bar, the other end of the sleeve being provided with a recessed head to receive the end of the spring.

It is practicable to adjust the pressure of the cutting apparatus on the trellis canopy not by the adjusting screw, but by a compensator connected to the free end of the feeler mechanism curved plate and interacting with the hydraulic selector and power cylinder of the actuating mechanism.

It is practicable to make the compensator in the shape of a casing accommodating a spring-loaded bellows whose chamber communicates with the selector and the lower part of the power cylinder and connected by its rod and a spring to the free end of the curved plate.

Other objects and advantages of the present invention will become apparent from the detailed description of the invention and the drawings in which.

Figure 1:
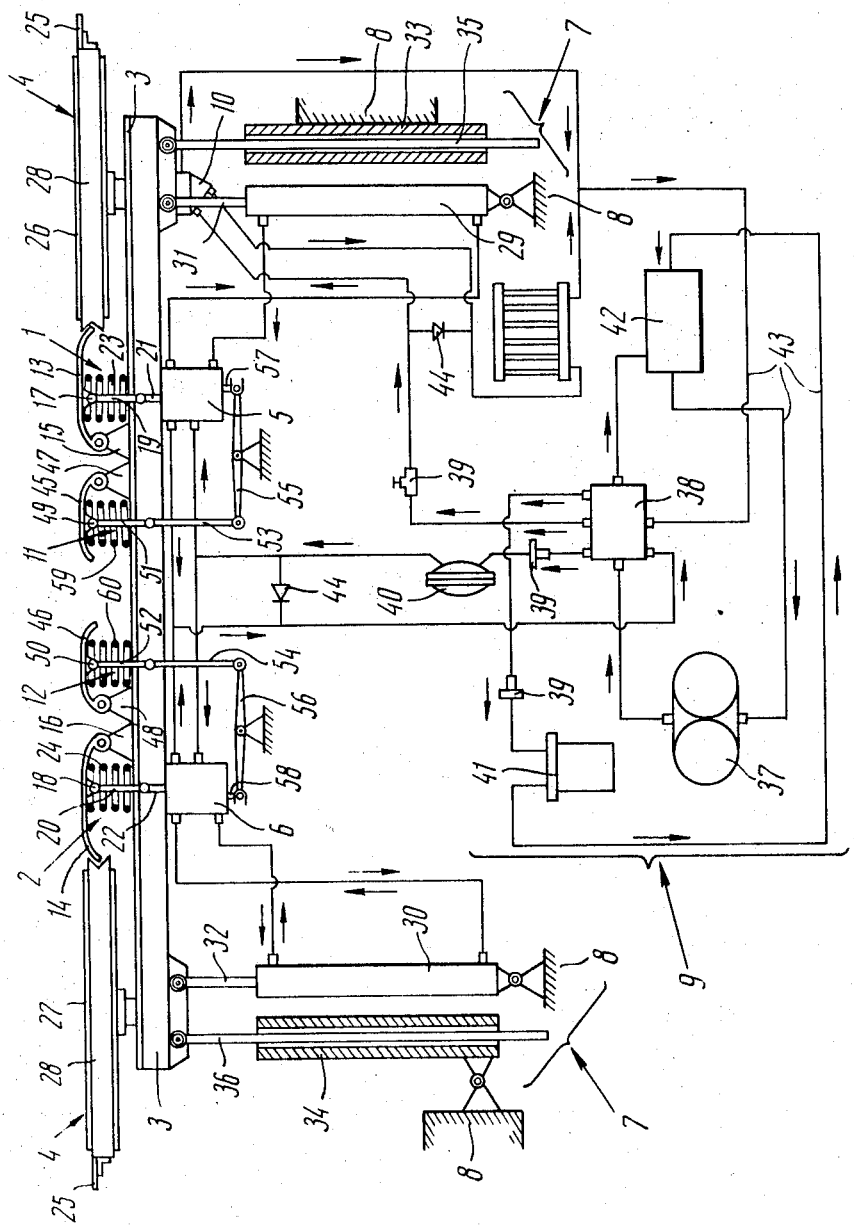
FIG. 1 is a diagrammatic illustration of a sensing unit of the harvester, according to the present invention.

In describing the present invention, terms in their narrow sense are used for the sake of lucidity. However, the invention is not confined to the narrow sense of the terms used and it will be understood that each of said terms embraces all the equivalent elements functioning similarly and employed for the same purposes.

The sensing unit comprises feeler mechanisms 1 and 2 mounted on a carrier bar 3 of the grape harvester which supports cutting apparatus 4; hydraulic selectors or fluid distributors 5 and 6 rigidly connected to the carrier bar 3 and interconnected with the feeler mechanisms 1 and 2; an actuating mechanism 7 serving to provide a movable support for the cutting apparatus 4 on the grape harvester frame 8 and connected to the hydraulic selectors 5 and 6; a hydraulic drive system 9 delivering the working fluid to the hydraulic selectors 5 and 6 and to the hydraulic motor 10 which actuates the cutting apparatus 4; and interlocks 11 and 12.

The feeler mechanisms 1 and 2 of the sensing unit are made in the shape of curved plates 13 and 14 articulated by one end to the brackets 15, 16 of the carrier bar 3. Located on the middle part of the inner surface of the curved plates 13 and 14 are joints 17 and 18 which are connected one end of links 19 and 20, the other ends of these links being connected to movable rods 21 and 22 of the hydraulic selectors 5 and 6. Springs 23 and 24 installed between the inner surfaces of the plates 13, 14 and the carrier bar 3 serve to return the plates 13 and 14 to the initial position.

The curved plates 13 and 14 are installed on the top of the cutting apparatus 4, somewhat behind the edges of its blades 25.

The cutting apparatus 4 comprises a driving pulley 26 mounted on the carrier bar 3 and rotated by a hydraulic motor 10. Mounted also on the carrier bar 3 and somewhat spaced from said pulley 26, by means of a slide (not shown in the drawing) mounted in guides is another pulley 27, said guides making it possible to move said pulley 27 towards and away from pulley 26. The pulleys 26 and 27 which have similar sizes carry a belt 28 carrying blades 25. By displacing the pulley 27 it is possible to vary the degree of tension of the belt 28. Additionally, mounted between the pulleys 26 and 27 are further pulleys (not shown in the drawing) which have similar sizes and are used to eliminate sagging of the belt. The axes of rotation of said pulleys are parallel to the axes of rotation of the pulleys 26 and 27 and, are equally spaced from the working strand of the belt 28. It is understood that it is possible to use a cutting apparatus of any other known design, provided it is capable of cutting off grape clusters.

The hydraulic selectors 5 and 6 and plates 13, 45 and 14, 46, respectively, used for controlling them are mounted on the carrier bar 3 which also mounts the cutting apparatus 4. A change in the position of said plates in the course of their interaction with trellises and vines results in a change of the position of the carrier bar 3, due to which these levers occupy their initial position.

The actuating mechanism 7 consists of two power cylinders 29 and 30 with rods 31, 32 and two guides 33, 34 with rods 35, 36.

The power cylinders 29 and 30 are articulated to the frame 8 of the machine, while their rods 31 and 32 are articulated to the ends of the carrier bar 3. The power cylinders 29 and 30 are in communication with the hydraulic drive system 9 via the hydraulic selectors 5 and 6.

The guide 33 is rigidly connected to the frame 8 of the machine while its rod 35 is articulated to the carrier bar 3.

The guide 34 is articulated to the frame 8 of the machine while its rod 36 is articulated to the carrier bar 3.

The hydraulic drive system 9 comprises a gear pump 37, a control panel 38, throttles 39, a hydraulic accumulator 40, a secondary oil filter 41, a hydraulic fluid tank 42, connecting pipework 43, and safety valves 44.

The interlocks 11 and 12 have spring-loaded levers 45 and 46 which are articulated at one end with the brackets 47, 48 of the carrier bar 3. The middle part of the inner surfaces of the curved plates 45, 46 is provided with joints 49, 50, connected to links 51, 52 by their one end and to links 53, 54 by the other; the links 53, 54 are connected to one end of rocker arms 55, 56 whose other ends are connected to movable members 57, 58 of the hydraulic selectors 5, 6.

Springs 59, 60 installed between the inner surfaces of the curved plates 45, 46 and the carrier bar are intended to return the plates to the initial position during operation.

Figure 2:
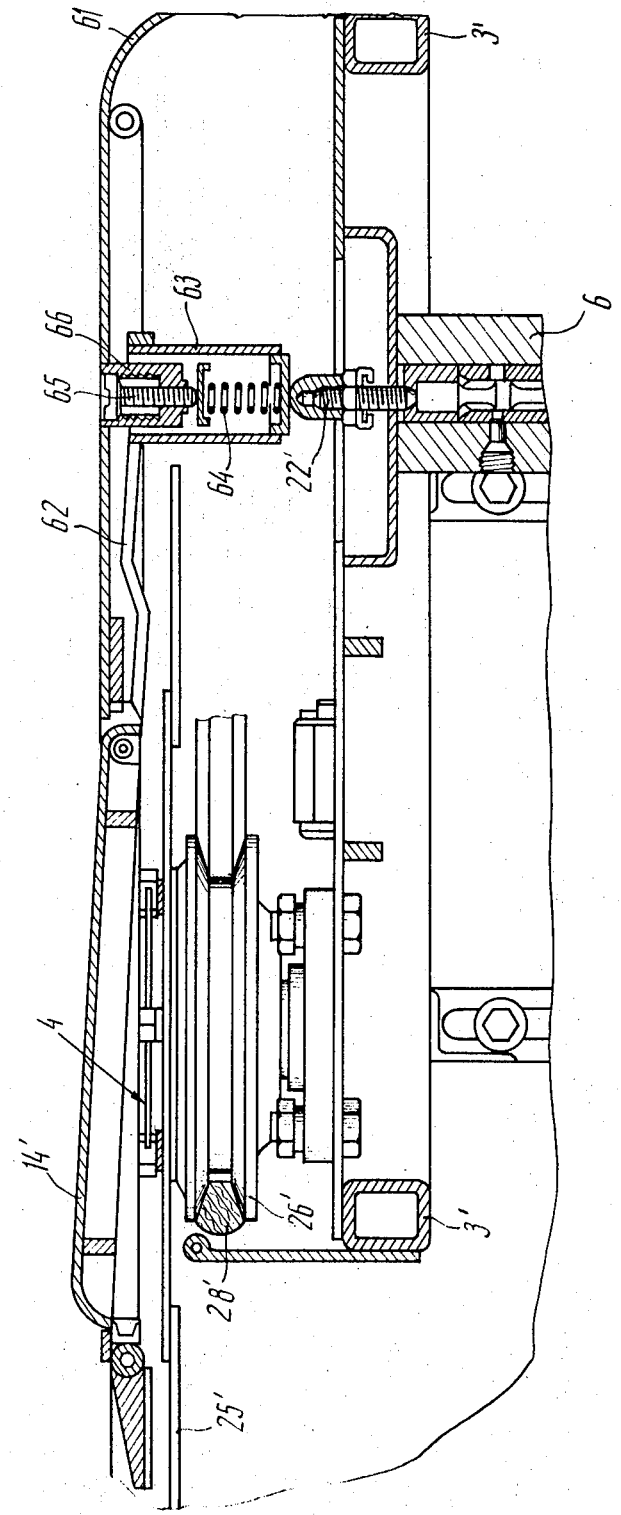
FIG. 2 is an enlarged cross-sectional view of a variant of the embodiment of the unit shown in FIG. 1.

Another embodiment of the feeler mechanisms is shown in FIG. 2. The curved plate 13', 14' is articulated to a guard housing 61 secured to the carrier bar 3' and has a lever 62 to which a sleeve 63 is connected; this sleeve rests on the rod 22' of the control valve of the hydraulic selector 6. Located inside the sleeve 63 is a spring 64 whose other end bears against an adjusting screw 65 of a sleeve 66, the latter being rigidly connected to the guard housing 61 and telescoping into the sleeve 63.

The adjusting screw 65 is intended to change the pressures by the cutting apparatus 4' on the canopy of the vineyard trellis.

Figure 3:
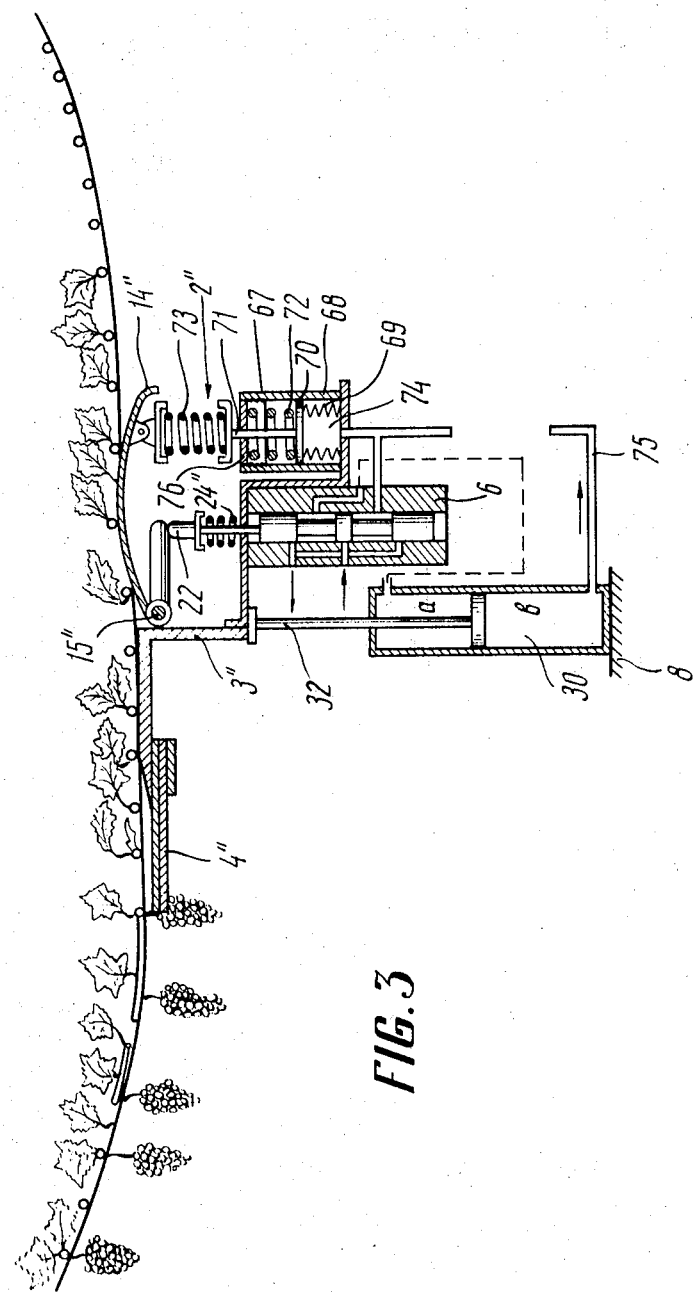
FIG. 3 shows an enlarged cross-sectional view of another variant of the embodiment of the unit shown in FIG. 1.

A form of automatic control of the pressures exerted by the cutting apparatus on the vineyard trellis canopy is shown in FIG. 3.

In this embodiment the cutting apparatus pressures are adjusted by a compensator 67 made in the shape of a casing 68 accommodating a bellows 69 with a rod 71, spring 72 and an adjusting nut 76. The rod 71 is articulated by a spring 73 to the curved plate 14" of the feeler mechanism 2.

The chamber 74 of the bellows 69 is in communication with the hydraulic selector 6 and power cylinder 30 through a small diameter pipe 75 in the bottom of the casing 68.

The sensing unit, according to the invention, and to be used in the grape harvester, operates as follows.

As the grape harvester enters the vineyard row middle i.e. the space between two rows on which trellises are tensioned, the operator starts the hydraulic drive and the follow-up unit by means of the control panel 38. The fluid is forced by the gear pump 37 into the "pressure" space of the hydraulic selectors 5, 6. Inasmuch as there is still no contact between the cutting apparatus 4 and the canopy, the curved plates 45, 46 of the interlocks 11, 12 and the curved plates 13, 14 of the feeler mechanisms 1, 2 are held by the springs 23, 24 and 59, 60 in the uppermost position. The rods 21, 22 of the control valves of the hydraulic selectors 5, 6 are also in the uppermost position so that the working fluid should be delivered into the lower spaces of the power cylinders 29, 30 and the bar 3 will be forced upwards. However, the ends of the bar 3 do not rise since the pressure of the working fluid is not transmitted into the power cylinders 29, 30. This occurs because the control valves 57, 58 of the hydraulic selectors 5, 6 overlap the inlet holes.

As the grape harvester starts moving along the vineyard in the middle between two rows, the curved plates 45, 46 touching upon the trellis canopy will be forced to move down and, pivoting about the joints of the brackets 47, 48 will push in the control valves 57, 58 of the hydraulic selectors 5, 6 of the interlocks 11, 12 via the links 53, 54 and rocker arms 55, 56. This will admit the pressure of the working fluid to the rods 21, 22 of the control valves of the feeler mechanisms 1, 2. As has been stated above, at the beginning of operation, the curved plates 13, 14 of the feeler mechanisms are lifted by the springs 23, 24. The rods 21, 22 of the control valves are also lifted so that, as soon as the control valves 57, 58 of the interlocks admit the pressure of the working fluid to the rods 21, 22 of the feeler mechanisms 1, 2, this pressure is transmitted into the lower spaces of the power cylinders 29, 30 and the bar 3 together with the cutting apparatus 4, the curved contacting plates 13, 14 and the curved plates 45, 46 will start moving upward, pressing the curved plates 13, 14 and 45, 46 against the trellis canopy.

As the bar 3 with the cutting apparatus 4 reaches the trellis canopy and continues the accent, the pressure of the canopy on the curved plates 13, 14 of the feeler mechanism and on the curved plates 45, 46 increases. The bar 3 together with the cutting apparatus 4 starts forcing the vine canes with grape clusters upwards, straightening the canopy in front of the edges of the blades 25 of the cutting apparatus 4.

At the same time the curved plates 13, 14 of the feeler mechanisms 1, 2 will touch the canopy and stop, overcoming the resilient resistance of the springs 23, 24; then, as the bar 3 continues moving upwards, the plates 13, 14 will begin moving down with respect to this bar, that is turning around the joints of the brackets 15, 16. The links 19, 20 will press the rods 21, 22 of the control valves and, compressing the springs 23, 24 will move them down relative to the casings of the hydraulic selectors 5, 6, closing the access of the working fluid to the power cylinders 29, 30. The upward movement of the bar 3 together with the cutting apparatus 4 will cease, and the blades 25 of the cutting apparatus 4 will be positioned at the height of the grape cluster stems.

Later on, as the grape harvester continues moving between two rows, the operating elements will follow the surface of the canopy automatically; this automatic action will be performed as follows.

If the canopy before the grape harvester sags, the canopy pressure on the curved plates 13, 14 of the feeler mechanisms 1, 2 increases. This pressure will overcome the force of the springs 23, 24, turn the curved plates 13, 14 around the joints of the brackets 15, 16 and lower the rods 21, 22 of the control valves of the hydraulic selectors 5, 6 via the links 19, 20. The pressure of the working fluid will be admitted to the upper spaces of the power cylinders 29, 30 and the ends of the bar 3 will go down together with the cutting apparatus 4. As soon as the pressure of the trellis canopy on the curved plates 13, 14 decreases due to withdrawal of the bar 3 with the cutting apparatus 4, the valve rods 21, 22 will be lifted by the springs 23, 24 via the links 19, 20; the delivery of the working fluid into the power cylinders will cease and the bar 3 will stop.

As it can be seen from the description of operation of the sensing unit, the curved plates 13, 14 of the feeler mechanisms and the curved plates 45, 46 of the interlocks are kept pressed all the time against the trellis canopy by the springs 23, 24 and 59, 60. The curved plates 45, 46 move up and down with respect to the canopy together with the curved plates 13, 14 of the feeler mechanisms 1, 2, but their travel is so selected that the "pressure" spaces in the hydraulic selectors 5, 6 are not locked.

If it happens that there are no vinecanes on the canopy before the moving grape harvester (this may occur if a bush is missing or has fallen down) the curved plates 45, 46 of the interlock mechanisms will have nothing to be in contact with and will be urged upwards by the springs 59, 60 as a result of which the links 53, 54 and levers 55, 56 connected to these plates will turn and pull out the rods of the interlock control valves 57, 58, thereby stopping the supply of the working fluid to the rods 21, 22 of the control valves of the feeler mechanisms 1, 2. The working fluid will be locked in both spaces of the power cylinders 29, 30 and the bar 3 together with the cutting apparatus 4 will stay immovable with respect to the trellis canopy thus protecting the trellis canopy framework and the cutting apparatus 4 against damage. The same takes place when the grape harvester leaves the vineyard row space when there is no support for the curved plates 13, 14 of the feeler mechanisms 1, 2 and the curved plates 45, 46 of the interlocks 11, 12.

Since the bar 3 has two feeler mechanisms 1, 2, two interlocks 11, 12 controlling the two hydraulic selectors 5, 6, and two power cylinders 29, 30, the ends of this bar can move independently of each other, which makes up for the non-uniform sagging of the trellis canopy and cocking of the grape harvester caused by the irregularities of the ground surface in the vineyard row middles.

The actuating force of the curved plates 13, 14 of the feeler mechanisms 1, 2 and, consequently, the pressure on the canopy depends on the stiffness of the springs 23, 24. If the clusters on the trellis canopy are abundant and heavy, their straightening in front of the edges of the blades 25 of the cutting apparatus 4 will require a strong pressure. A smaller number of clusters will require a smaller pressure.

The pressure on the trellis canopy should be adjusted before starting the operation of the grape harvester, when the yield of the vineyard is known.

Shown in FIG. 2 is an example of the adjusting device. To increase the pressure on the canopy it is sufficient to precompress the spring 64 for which purpose the screw 65 should be rotated clockwise.

To reduce the pressure on the trellis canopy, the stiffness of the spring 64 should be diminished by rotating the screw 65 counterclockwise. The approximate stiffness of the spring is set during adjustments of the pressure on the canopy.

If the yield on individual bushes and in adjacent rows varies widely, it becomes necessary to adjust the pressure on the trellis canopy often. Shown in FIG. 3 is an embodiment of the adjusting device with automatic control of the pressure on the trellis canopy, in proportion to the weight of the grape clusters on the canopy.

As the bar 3" goes upwards, the fluid pressure is transmitted from the hydraulic selector 6 into the lower space $b$ of the power cylinder 30 which causes its rod 32 to move. Concurrently, the fluid pressure is transmitted through the small diameter pipe 75 into the inner space of the bellows 69 of the compensator 67 and expands said bellows. The spring 72 of the compensator 67 is compressed and the rod 71 moves upwards. If at this moment the curved plate 14" touches the trellis canopy, the spring 24" of the curved plate 14" of the feeler mechanism will be compressed. The pressure on the canopy will increase. As soon as the pressure in the inner chamber of the bellows 69 is balanced by the force of the spring 72 the rod 71 will cease moving upwards and the spring 24" of the feeler mechanism curved plate 14" will be precompressed reaching the stiffness set by the adjustments and the pressure on the trellis canopy will reach a predetermined value.

As the bar 3" together with the cutting apparatus 4" exerts a definite pressure on the canopy and continues moving upwards, the pressure of the canopy on the curved plate 14" will exceed the resilient force of the spring 24" and force this plate down. The rod 22" of the control valve will also move down thereby locking the delivery of the working fluid to the power cylinder 30. Hence, the further upward movement of the bar 3" will cease.

As the grape harvester continues moving forward, the pressure exerted on the canopy will change automatically. Thus, if the machine encounters a section of the trellis whose canopy has more grape clusters than the preceding section, the weight of the clusters, vinecanes and leaves imposed on the bar will increase which will be transmitted via the rod 32 of the power cylinder 30 to the space $b$ of the power cylinder on which the bar is installed. The higher pressure in the lower space $b$ of the power cylinder 30 will be transmitted through the small-diameter pipe 75 into the inner chamber of the bellows 69. The bellows will expand thereby compressing the spring 72 of the compensator 67 and the spring 73 of the curved plate 14".

Since the compensator 67 is connected by the pipe 75 to the lower space of the power cylinder 29 and the rod 22" of the control valves of the hydraulic selector 5 occupies a neutral position (assuming that the height of the canopy above the ground has not changed), the curved plate will not change its position with respect to the trellis canopy but will exert a stronger pressure on it. In this case, moving the bar 3" down from the canopy will require a higher pressure upon the curved plate 14" of the feeler mechanism 1, that is the pressure on the canopy will increase in proportion to the increase in the weight of grapes on a given section of the trellis canopy. The heavier the clusters on the canopy, the higher will be the pressure applied to it by the bar 3″.

However, this pressure is limited in order to avoid damaging the canopy if the grape harvester drives into a hillock or the canopy sags too low. In the compensator there is provision for adjusting the maximum pressure on the canopy by means of the nut 76 and by changing the compression of the spring 72 of the compensator 67.

As the spring 72 of the compensator 67 is completely compressed, it will no longer be able to compress the spring 73 of the curved plate 14″ of the feeler mechanism 2″. Therefore, if the canopy pressure exceeds the stiffness of the spring 73, the plate 14″ will turn around the joint 15″, the member 22″ of the hydraulic selector 6 will go up and the working fluid will be delivered into the upper space $a$ of the power cylinder 30 and the bar 3″ will naturally move down.

As the bar 3″ goes down, the fluid pressure in the lower space $b$ of the power cylinder 30 will diminish and the pressure in the bellows 69 will drop. Then the spring 72 of the compensator 67 will stretch, pulling the rod 71 down. This will reduce the compression of the spring 73 thereby reducing the pressure on the canopy.

When the bar 3″ goes down, the curved plate 13 of the feeler mechanism 2″ remains pressed against the trellis canopy which causes the hydraulic selector 6 to move with respect to the rod 22″ of the hydraulic selector 6. This movement continues until the rod 22″ of the control valve closes the channels in the hydraulic selector 6, after which the delivery of the working fluid into the power cylinder 30 will cease and the bar 3 will no longer move away from the canopy.

The above description refers to the functioning of one compensator only. It is understood that each feeler mechanism can be provided with a similar compensator.

The bar 3″ carries two compensators of this type, therefore the pressure exerted on the canopy by both curved plates will be different, varying with the part of the weight imposed on each of them.

Usually, the clusters of grapes are distributed irregularly across the width of the canopy and the introduction into the design of two compensators improves the quality of harvested grapes substantially because in this case the canopy becomes better straightened in front of the edges of the blades of the cutting apparatus.

While a specific embodiment of the invention has been disclosed hereinabove, it will be understood that various modifications and changes within the spirit and the scope of the invention may occur to those skilled in the art.

These changes and modifications can be resorted to without departing from the spirit and scope of the invention as hereinafter defined in the appended claims.

We claim:

1. A sensing unit for a grape harvester in which vines are on and above trellises that are disposed substantially horizontally, said sensing unit comprising a frame; a carrier bar; at least two power cylinders pivotably connected to said bar and said frame; hydraulic selectors in a number corresponding to that of the power cylinders, said selectors being mounted on said bar and connected to said cylinders; and spring-loaded plates mounted in pairs on said bar and protruding upwards therefrom, so that in its non-operating position one of the plates of each pair protrudes above the other one; and means coupling said plates of each of said pairs to one of said hydraulic selectors and interacting with said trellises and vines, whereby working medium is delivered to said power cylinders when the plates which normally protrude the greater amount upwards are depressed and approach the upper position of the other plates to maintain said bar at substantially the same distance with respect to said trellises and vines; and a cutting apparatus mounted on said bar to cut off grape clusters.

2. A sensing unit according to claim 1, in which said spring-loaded plates include springs to level said trellises to make it convenient to cut off grape clusters.

3. A sensing unit according to claim 2 comprising means for adjusting the strength of said springs.

4. A sensing unit according to claim 3, in which said means for controlling the strength of said springs comprises a bellows having one of said springs resting thereon and additionally loaded by a spring which is more rigid than the first; said bellows communicating with one of said power cylinders.

References Cited

UNITED STATES PATENTS 2,660,015  11/1953  Briscoe _____ 56—11
2,893,194  7/1959  Lamouria _____ 56—331

RUSSELL R. KINSEY, Primary Examiner